(12) United States Patent
Okawa

(10) Patent No.: US 9,823,546 B2
(45) Date of Patent: Nov. 21, 2017

(54) PHOTOGRAPHING DEVICE AND CONTROL METHOD FOR PHOTOGRAPHING DEVICE

(71) Applicant: Olympus Corporation, Shibuya-ku, Tokyo (JP)

(72) Inventor: Satoshi Okawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/882,561

(22) Filed: Oct. 14, 2015

(65) Prior Publication Data

US 2016/0116824 A1    Apr. 28, 2016

(30) Foreign Application Priority Data

Oct. 23, 2014   (JP) ................................ 2014-216082

(51) Int. Cl.
*G03B 13/34* (2006.01)
*G03B 3/10* (2006.01)
*G03B 17/12* (2006.01)

(52) U.S. Cl.
CPC ............... *G03B 13/34* (2013.01); *G03B 3/10* (2013.01); *G03B 17/12* (2013.01)

(58) Field of Classification Search
USPC .......................................................... 396/81
See application file for complete search history.

(56) References Cited

U.S. PATENT DOCUMENTS 5,832,318 A    11/1998   Sato 6,724,429 B2 *  4/2004  Shore ..................... G03B 13/20
                                                    348/373
7,079,182 B1 *  7/2006  Yoshikawa ............ G02B 7/102
                                                    348/211.6
2003/0107821 A1 *  6/2003  Nakamura ............... G02B 7/08
                                                    359/694

(Continued)

FOREIGN PATENT DOCUMENTS

JP    2013-050501    3/2013

OTHER PUBLICATIONS

Office Action to corresponding Chinese Patent Application No. 201510685631.6, dated Jul. 18, 2017 (8 pgs.).

*Primary Examiner* — Clayton E Laballe
*Assistant Examiner* — Linda B Smith
(74) *Attorney, Agent, or Firm* — John C. Pokotylo; Pokotylo Patent Services

(57) ABSTRACT

A photographing device, comprising a memory for storing relationships between movement of the focus adjustment lens and image plane movement amount, a controller for setting movement amount of the focus adjustment lens constituting a specified image plane movement amount with respect to unit rotation amount of the ring member, based on a relationship that is stored in the memory, and controlling movement of the focus adjustment lens in accordance with rotation amount and rotation direction of the ring member based on the movement amount, and a rotation velocity detector for detecting rotation velocity of the ring member, wherein the control section, when rotation velocity is smaller than a specified value, sets a movement amount of the focus adjustment lens constituting a specified image plane movement amount with respect to unit rotation amount of the ring member, based on a relationship that is stored in the storage section.

20 Claims, 11 Drawing Sheets

(56) References Cited

U.S. PATENT DOCUMENTS

| | | | |
|---|---|---|---|
| 2005/0190282 A1* | 9/2005 | Shibagami | H04N 5/23296 348/335 |
| 2009/0244325 A1* | 10/2009 | Honjo | G02B 7/102 348/231.99 |
| 2011/0164154 A1* | 7/2011 | Honjo | G03B 17/14 348/241 |
| 2012/0243856 A1* | 9/2012 | Shibuno | G03B 13/32 396/76 |
| 2013/0222926 A1* | 8/2013 | Kawada | G03B 3/10 359/696 |
| 2013/0265467 A1* | 10/2013 | Matsuzawa | H04N 5/23296 348/240.1 |
| 2014/0028864 A1* | 1/2014 | Tsubusaki | H04N 5/23245 348/208.12 |
| 2014/0211323 A1* | 7/2014 | Sugiura | G03B 17/00 359/698 |
| 2015/0042867 A1* | 2/2015 | Shiono | G03B 13/32 348/348 |

\* cited by examiner

FIG. 9A  FINE ADJUSTMENT
| | COEFFICIENT |
|---|---|
| SLOW | 0.8 |
| SLIGHTLY SLOW | 0.9 |
| STANDARD | 1 |
| SLIGHTLY FAST | 1.1 |
| FAST | 1.2 |
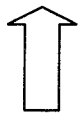
| | a1 | a2 | a3 |
|---|---|---|---|
| | 0.8*a1 | 0.8*a2 | 0.8*a3 |
| | 0.9*a1 | 0.9*a2 | 0.9*a3 |
| | 1*a1 | 1*a2 | 1*a3 |
| | 1.1*a1 | 1.1*a2 | 1.1*a3 |
| | 1.2*a1 | 1.2*a2 | 1.2*a3 |
FIG. 9B  COARSE ADJUSTMENT
| | COEFFICIENT |
|---|---|
| SLOW | 0.8 |
| SLIGHTLY SLOW | 0.9 |
| STANDARD | 1 |
| SLIGHTLY FAST | 1.1 |
| FAST | 1.2 |

PHOTOGRAPHING DEVICE AND CONTROL METHOD FOR PHOTOGRAPHING DEVICE

Benefit is claimed, under 35 U.S.C. §119, to the filing date of prior Japanese Patent Application No. 2014-216082 filed on Oct. 23, 2014. This application is expressly incorporated herein by reference. The scope of the present invention is not limited to any requirements of the specific embodiments described in the application.

BACKGROUND OF THE INVENTION

1. Field of the Invention

The present invention relates to a photographing device having an operating section for manually adjusting a photographing lens, and a control method for a photographing device.

2. Description of the Related Art

A photographing device having a range ring provided on a photographing lens, and with which focus adjustment is carried out manually by manually rotating this ring member, is generally known. With this type of photographing device, movement of a focus lens is carried out in accordance with rotation velocity of the range ring. However, since a minimum movement amount of the focus lens differs at the wide-angle side and the telephoto side depending on zoom lens position, manual focus adjustment is generally difficult at the wide-angle side.

In order to solve this problem, in Japanese patent laid open number 2013-50501 (hereafter referred to as patent literature 1), operability at the wide-angle side is improved by making focus lens movement sensitivity at the wide-angle side low, by making a rotation amount of the range ring at the wide-angle side, for minimum lens movement amount of the focus lens, larger than the telephoto side.

SUMMARY OF THE INVENTION

According to the photographing device disclosed in patent literature 1, it is possible to improve operability at the wide-angle side. However operations for focus adjustment by the user can be divided into coarse adjustment and fine adjustment, and with the photographing device disclosed in patent literature 1 operation feeling for coarse adjustment and fine adjustment is not sufficient. Coarse adjustment is an operation when the user wants to carry out focus adjustment rapidly, and is focus adjustment to search for an approximately in-focus position using a swift rotation operation of the range ring. Also, fine adjustment is operation when the user wants to carry out focus adjustment minutely, and is focus adjustment to search for an exact in-focus position using a slow rotation operation of the range ring.

In the case of a zoom lens, a number of pulses for driving the focus lens from the infinity end to the close up end (this number of forces is proportional to drive amount of the focus lens, and the number of pulses is abbreviated to Pls Number) differs depending on the zoom state of the photographing lens. Generally, the shorter the focal length the smaller the drive amount (also called stroke pulses) from the infinity end to the close up end of the focus lens, and if focal length becomes long stroke pulses become more numerous. For example, stroke pulses for a focal length at the wide end of 40 mm and stroke pulses for a focal length at the telephoto end of 150 mm differ in Pls number by about 10 times.

This means that in a case where coarse adjustment is carried out by the user in order to focus rapidly, at the wide-angle side image plane movement velocity is fast, while at the telephoto side image plane movement velocity is slow. As a result, it was necessary to operate the range ring many times to carry out focus, depending on the focal length.

When carrying out focusing with fine adjustment of the photographing lens, wide-open aperture value and focus sensitivity (also called image plane movement amount for unit movement amount of the focus lens, Fc sensitivity) vary depending on the zoom states, and Pls number changes in accordance with permissible depth. If this Pls number changes, it will result in a different image plane movement amount for the same operational rotation amount, which means that operational feeling for manual focus will be different depending on the zoom state.

An object of the present invention is to provide a photographing device that improves operability when carrying out focus adjustment of a photographing lens manually with coarse adjustment and fine adjustment, and a control method for a photographing device.

A photographing device of the present invention comprises: a focus adjustment lens that is capable of moving in an optical axis direction provided inside a lens barrel containing a photographing lens, a ring member which is arranged to be rotatable with respect to the lens barrel, a rotation detector for detecting rotation amount and rotation direction of the ring member, a memory for storing a relationship between movement amount of the focus adjustment lens and image plane movement amount, a controller for setting movement amount of the focus adjustment lens constituting a specified image plane movement amount with respect to unit rotation amount of the ring member, based on the relationship that is stored in the memory, and controlling movement of the focus adjustment lens in accordance with rotation amount and rotation direction of the ring member based on the movement amount, and a rotation velocity detector for detecting rotation velocity of the ring member, wherein the controller, when rotation velocity that has been detected by the rotation velocity detector is smaller than a specified value, sets a movement amount of the focus adjustment lens constituting a specified image plane movement amount with respect to unit rotation amount of the ring member, based on a relationship that is stored in the memory.

A photographing device of the present invention comprises: a focus adjustment lens that is capable of moving in an optical axis direction provided inside a lens barrel containing a photographing lens, a ring member which is arranged to be rotatable with respect to the lens barrel, a rotation detector for detecting rotation amount and rotation direction of the ring member, a rotation velocity detector for detecting rotation velocity of the ring member, a memory for storing a relationship between rotation velocity of the ring member and movement amount of the focus adjustment lens, and a controller for setting a specified movement amount with respect to rotation velocity of the ring member, based on the relationship that is stored in the memory, and controlling movement of the focus adjustment lens in accordance with rotation amount and rotation direction of the ring member based on the movement amount, wherein the controller, when rotation velocity that has been detected by the rotation velocity detector is larger than a specified value, sets a specified movement amount with respect to rotation velocity of the ring member, based on a relationship that is stored in the memory.

A control method for a photographing device of the present invention is a control method for a photographing device that comprises a focus adjustment lens that is capable of moving in an optical axis direction provided inside a lens barrel containing a photographing lens, a ring member which is arranged to be rotatable with respect to the lens barrel, a rotation detector for detecting rotation amount and rotation direction of the ring member, and a memory for storing a relationship between movement amount of the focus adjustment lens and image plane movement amount, and the control method comprises setting movement amount of the focus adjustment lens constituting a specified image plane movement amount with respect to unit rotation amount of the ring member, based on the relationship that is stored in the memory, controlling movement of the focus adjustment lens in accordance with rotation amount and rotation direction of the ring member based on the movement amount, and when rotation velocity of the ring member is smaller than a specified value, setting a movement amount of the focus adjustment lens constituting a specified image plane movement amount with respect to unit rotation amount of the ring member, based on a relationship that is stored in the memory.

A control method for a photographing device of the present invention is a control method for a photographing device that comprises a focus adjustment lens that is capable of moving in an optical axis direction provided inside a lens barrel containing a photographing lens, a ring member which is arranged to be rotatable with respect to the lens barrel, a rotation detector for detecting rotation amount and rotation direction of the ring member, and a memory for storing a relationship between rotation velocity of the ring member and movement amount of the focus adjustment lens, and the control method comprises setting a specified image plane movement amount with respect to rotation velocity of the ring member, based on the relationship that is stored in the storage section, controlling movement of the focus adjustment lens in accordance with rotation amount and rotation direction of the ring member based on the movement amount, and when rotation velocity that has been detected by the rotation velocity detector is larger than a specified value, setting a specified movement amount with respect to rotation velocity of the ring member, based on a relationship that is stored in the memory.

BRIEF DESCRIPTION OF THE DRAWINGS

FIG. 9A and FIG. 9B are tables showing one example of setting values for fine adjustment and coarse adjustment for enabling change of MF operation velocity in user settings, in a modified example of the camera of one embodiment of the present invention.

DETAILED DESCRIPTION OF THE PREFERRED EMBODIMENTS

Figure 1:
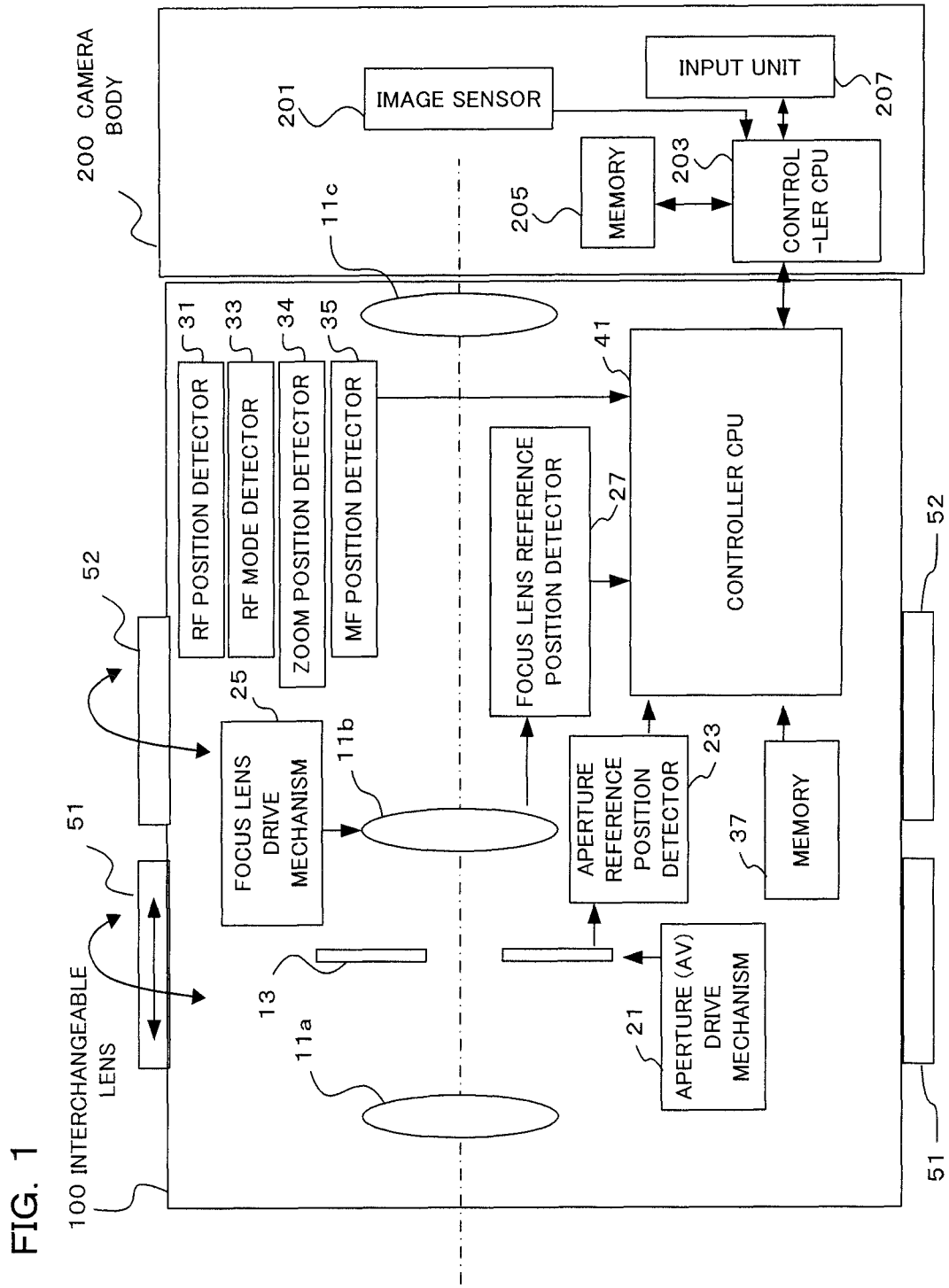
FIG. 1 is a block diagram showing the structure of a camera of one embodiment of the present invention.
Figure 2:
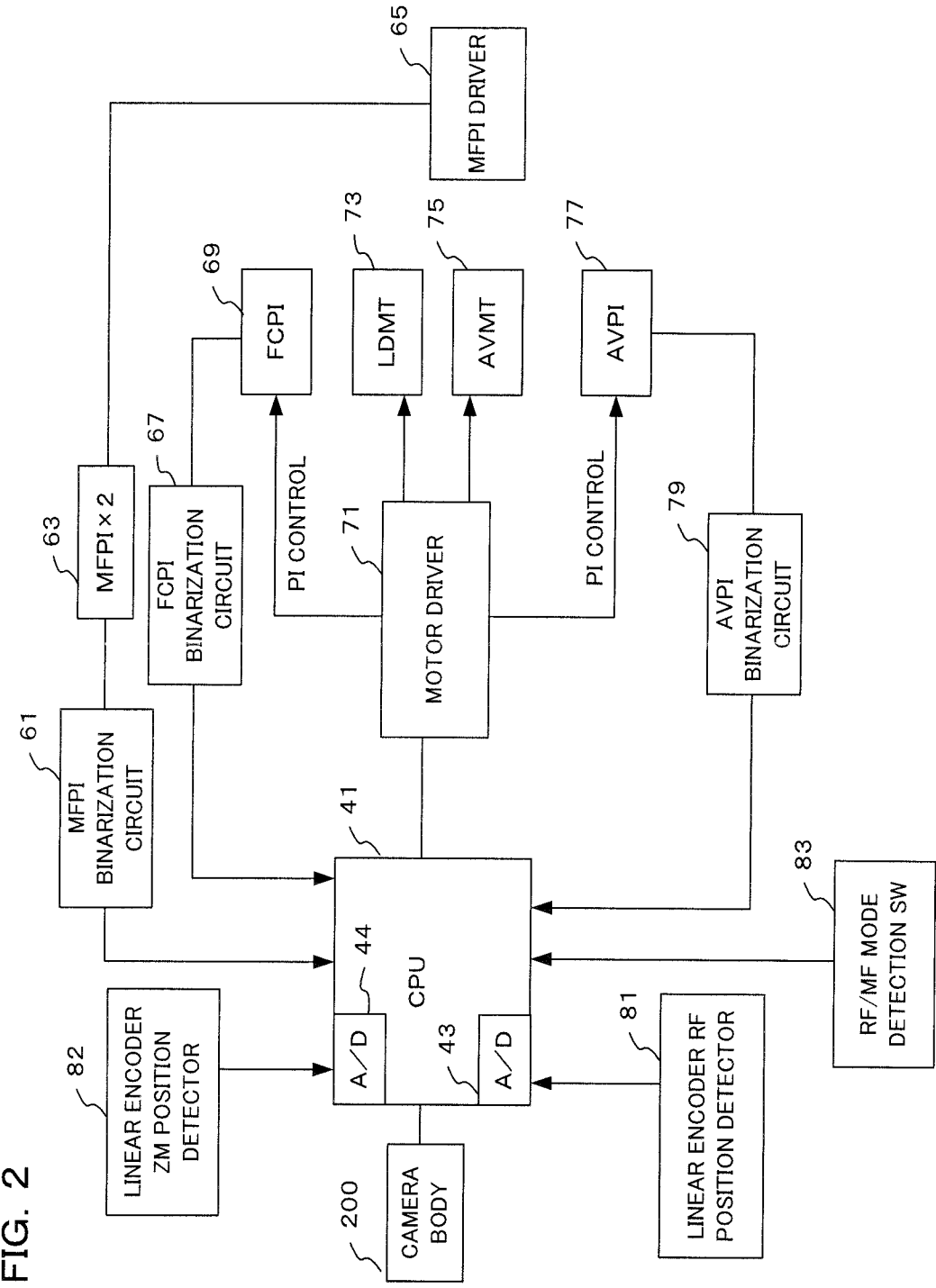
FIG. 2 is a block diagram mainly showing the electrical structure of the camera of one embodiment of the present invention.

A preferred one embodiment using a camera to which the present invention has been applied will be described in the following in accordance with the drawings. FIG. 1 is a block diagram showing the structure of a camera of one embodiment of the present invention, and FIG. 2 is a block diagram showing the electrical structure of this camera. This camera comprises an interchangeable lens 100, and a camera body 200 to which this interchangeable lens 100 is attached. It is also possible, however, for the lens barrel and the camera body to be integrally formed.

A photographing lens 11 made up of lenses 11a to 11c is provided within the interchangeable lens 100. A subject image is formed by the photographing lens 11. Within this lens 11, a focus lens 11b is a lens for focus adjustment, and is capable of being moved in the optical axis direction by a focus lens drive mechanism 25. The focus lens drive mechanism 25 has a focus lens actuator and a focus lens drive circuit. Also, some of the lenses 11a-11c are zoom lenses for varying focal length. Zoom lens groups are therefore provided inside the interchangeable lens 100. The focus lens 11b corresponds to a focus adjustment lens that is capable of moving in an optical axis direction that is provided inside a lens barrel containing the photographing lens.

Also, a focus lens reference position detector 27 outputs a detection signal to a CPU (Central Processing Unit), being a controller, when the focus lens 11b reaches a reference position. A photo interrupter (PI) is used in reference position detection. With this embodiment, once the focus lens reference position detector 27 has detected the reference position, position detection of the focus lens 11b is carried out based on number of pulses (Pls number) applied to an actuator (using a stepping motor) for the focus lens with that position as a reference.

An aperture 13 is arranged between the lens 11a and the lens 11b. The aperture 13 has an opening size varied by an aperture drive mechanism 21, to vary an amount of subject light that passes through the photographing lens 11. The aperture drive mechanism 21 has an aperture actuator and an aperture drive circuit etc. A stepping motor is used as the actuator, and fine control is carried out using micro step drive. The aperture 13 may also be arranged at a position other than between the lens 11a and the lens 11b.

An aperture reference position detector 23 outputs a detection signal to the CPU 41 when an opening diameter of the aperture reaches a reference position. The CPU 41 acquires a reference position using the detection signal from the aperture reference position detector 23, and controls aperture position by detecting a relative position with respect to this reference position. Relative position detection involves detection using a number of pulses applied to a stepping motor, while reference position detection involves detection using a photo interrupter (PI).

A range ring 51 is arranged around the outside of the interchangeable lens 100. The range ring 51 is capable of being turned around the outside of the interchangeable lens 100, and also slides within a specified range of the optical axis direction of the photographing lens 11. If this range ring 51 is slid towards the subject side it is set to a non-RF (non-range focus) (sometimes also referred to as MF (manual focus)) position, and is set to an RF (range focus) position if it is slid towards the body side. Switching between RF mode and non-RF mode (MF mode) is carried out by sliding the range ring 51. Detection of this mode is carried out by an RF mode detector 33. Also, the range ring 51 is constructed to be capable of being turned between a close-up end and an infinity end. The range ring 51 fulfills a function as a ring member arranged capable of rotation with respect to a lens barrel.

Non-RF mode is a mode for carrying out focusing in accordance with rotation direction and rotation amount of the range ring 51 by the user, while RF mode is a mode for focusing to a distance that has been designated by the range ring 51. Specifically, non-RF mode and RF mode are both manual focus, but with non-RF mode designation of a relative distance is carried out by the range ring 51, and differs from RF mode where an absolute distance is designated.

If MF mode is set by sliding the range ring 51, light shielding blades at an inner side of the range ring 51 rotate as one with rotation of the range ring 51. This rotation of the light shielding blades is counted by the photo interrupter (PI), and the focus lens 11b is driven in accordance with this count value. Rotation direction and rotation amount of the range ring 51 may also be detected by a sensor other than a photo interrupter.

If RF mode has been set by sliding the range ring 51, then if the range ring 51 is rotated, that rotation position is detected by the RF position detector 31. The RF position detector 31 detects absolute position for rotation position of the range ring 51. The focus lens drive mechanism 25 drives the focus lens 11b to an imaging distance corresponding to the rotation position of the range ring 51, in accordance with control signals from the CPU 41.

The RF mode detector 33 detects which of the non-RF position (MF position) or the RF position the range ring 51 has been set to, based on output of an RF/MF mode detection switch 83 (refer to FIG. 2).

An MF position detector 35 detects rotation direction and rotation amount of the range ring 51, when the range ring 51 has been set to the non-RF position (MF position). Manual focus is carried out based on the detection result of this MF position detector 35. The MF position detector 35 is made up of an MFPI 63, MFPI binarization circuit 61 etc., which will be described later. The MF position detector 35 functions as a rotation detector for detecting rotation amount and rotation direction of the ring member. Also, pulse signals output in accordance with rotation of the range ring 51 that has been detected by the MF position detector 35 are counted over a specified time, to detect rotation velocity (refer, for example, to F301 in FIG. 4A, F331 in FIG. 5, S13 in FIG. 7, and #1 in FIG. 8). These structures function as a rotation velocity detector for detecting rotation velocity of the ring member.

A zoom ring 52 is arranged around the outside of the interchangeable lens 100, more to the body side than the range ring 51, and is capable of being turned around the outside of the interchangeable lens 100. The photographing lens is a zoom lens having variable focal length, and it is possible to carry out zooming if the user manually rotates the zoom ring 52. The zoom ring 52 provides a function as a focal length setting section.

A zoom position detector 34 detects an absolute value for rotation position of the zoom ring 52, and outputs to the CPU 41. As will be described later, the zoom position detector 34 has a linear encoder ZM position detector 82, output of this linear encoder position detector 82 is subjected to AD conversion by an A/D converter 44 within the CPU 41, and this AD conversion value represents focal length. The zoom position detector 34 provides a function as a zoom position detector for detecting zoom position of the zoom lens group A memory 37 is a rewritable nonvolatile memory, such as flash memory etc., and stores programs for the CPU 41, various information such as optical data of the interchangeable lens, various adjustment values, and various parameters etc.

The memory 37 also stores a Table_Fd table, a wide-open Fno table, and an FC sensitivity table, which will be described later, used in FIG. 4. The Table_Fd table stores image plane movement amount corresponding to input edge number X. The wide-open Fno table stores wide-open aperture value for each focal length. The FC sensitivity table stores FC sensitivity corresponding to current focal length.

The memory 37 also stores an Edg_div_thresh1~3 table, and a Table_Edge_div table, which will be described later, used in FIG. 5. The Edg_div_thresh1~3 table stores threshold values for region division corresponding to the input edge number X. The Table_Edge_div table stores coarse adjustment drive Pls number for every focal length.

Figures 4A, 4B:
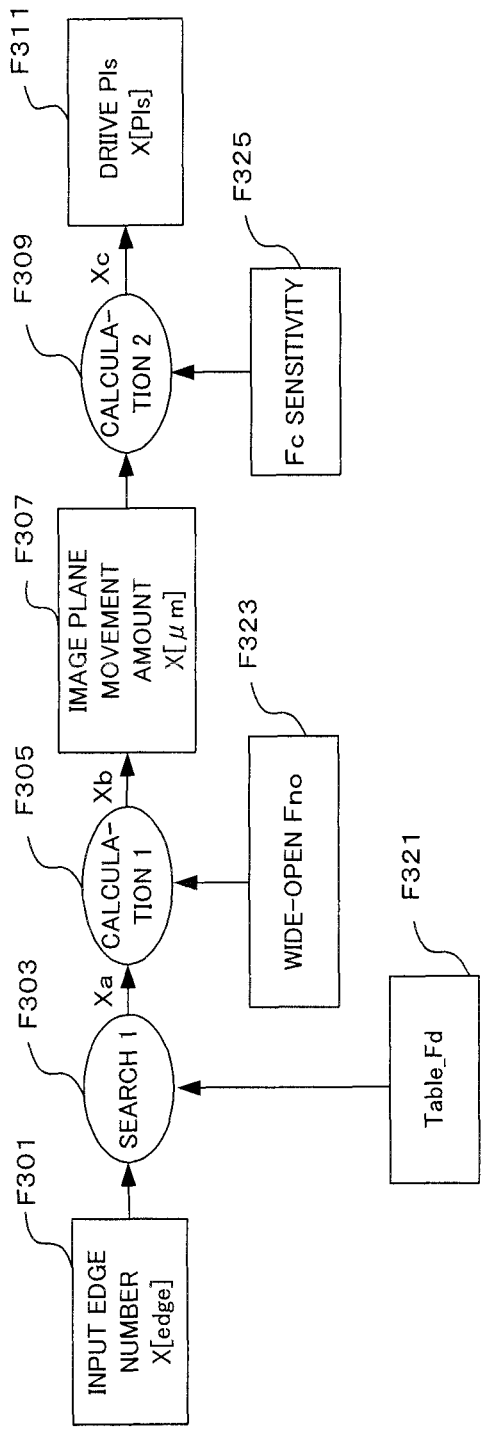
FIG. 4A and FIG. 4B are block diagrams showing calculation processing for fine adjustment drive, in the camera of one embodiment of the present invention.
Figure 5:
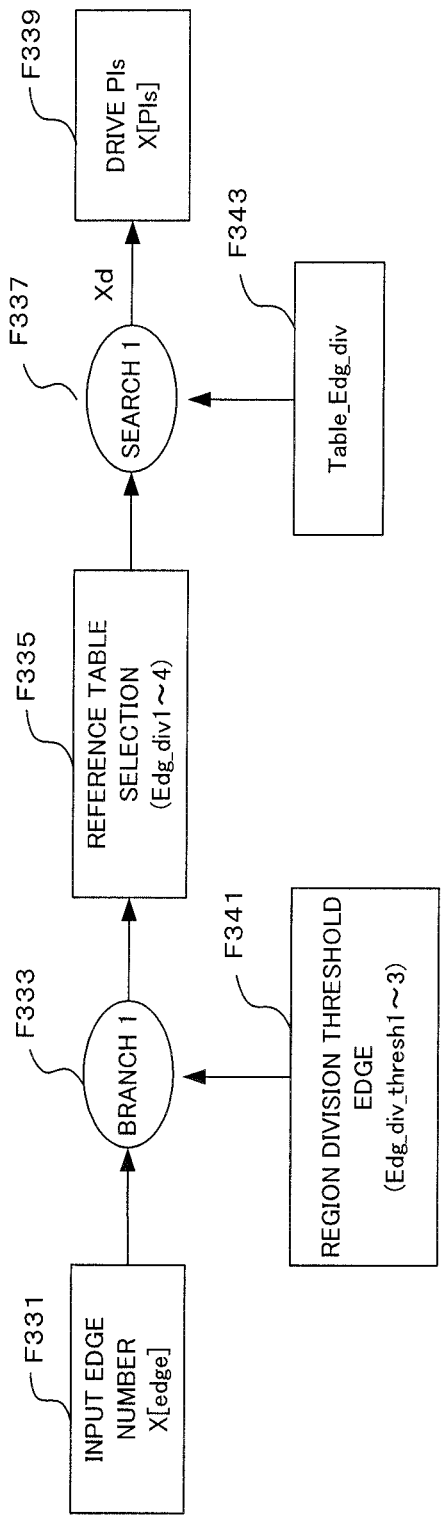
FIG. 5 is a block diagram showing calculation processing for coarse adjustment drive, in the camera of one embodiment of the present invention.

The memory 37 functions as memory for storing relationships between movement amount of the focus adjustment lens and image plane movement amount (for example, Table_Fd (F321) in FIG. 4A and Table_Edg_div in FIG. 5). The memory 37 also functions as memory for storing relationships between movement amount of the focus adjustment lens corresponding to focal length all the photographing lens, and image plane movement amount (for example, wide-open Fno (F323) and FC sensitivity (F325) in FIG. 4A). The memory 37 also functions as a memory for storing relationships between rotation velocity of the ring member and movement amount of the focus adjustment lens (for example, Table_Edg_div in FIG. 5).

In accordance with a program stored in the previously described memory 37, the CPU 41, which is a controller, carries out control within the interchangeable lens 100 in accordance with control instructions from the camera body 200. The CPU 41 is input with detection signals from the aperture reference position detector 23, focus lens reference position detector 27, the RF position detector 31, the RF mode detector 33, and the MF position detector 35, and outputs control signals to the focus lens drive mechanism 25 and the aperture drive mechanism 21.

The CPU 41 also functions as a controller for setting movement amount of the focus adjustment lens, constituting a specified image plane movement amount with respect to unit rotation amount of the ring member, based on a relationship stored in the memory, and controlling movement of the focus adjustment lens in accordance with rotation amount and rotation direction of the ring member, based on the movement amount. This control of movement of the focus adjustment lens will be described later using the flowcharts shown in FIG. 7 and FIG. 8.

Figure 8:
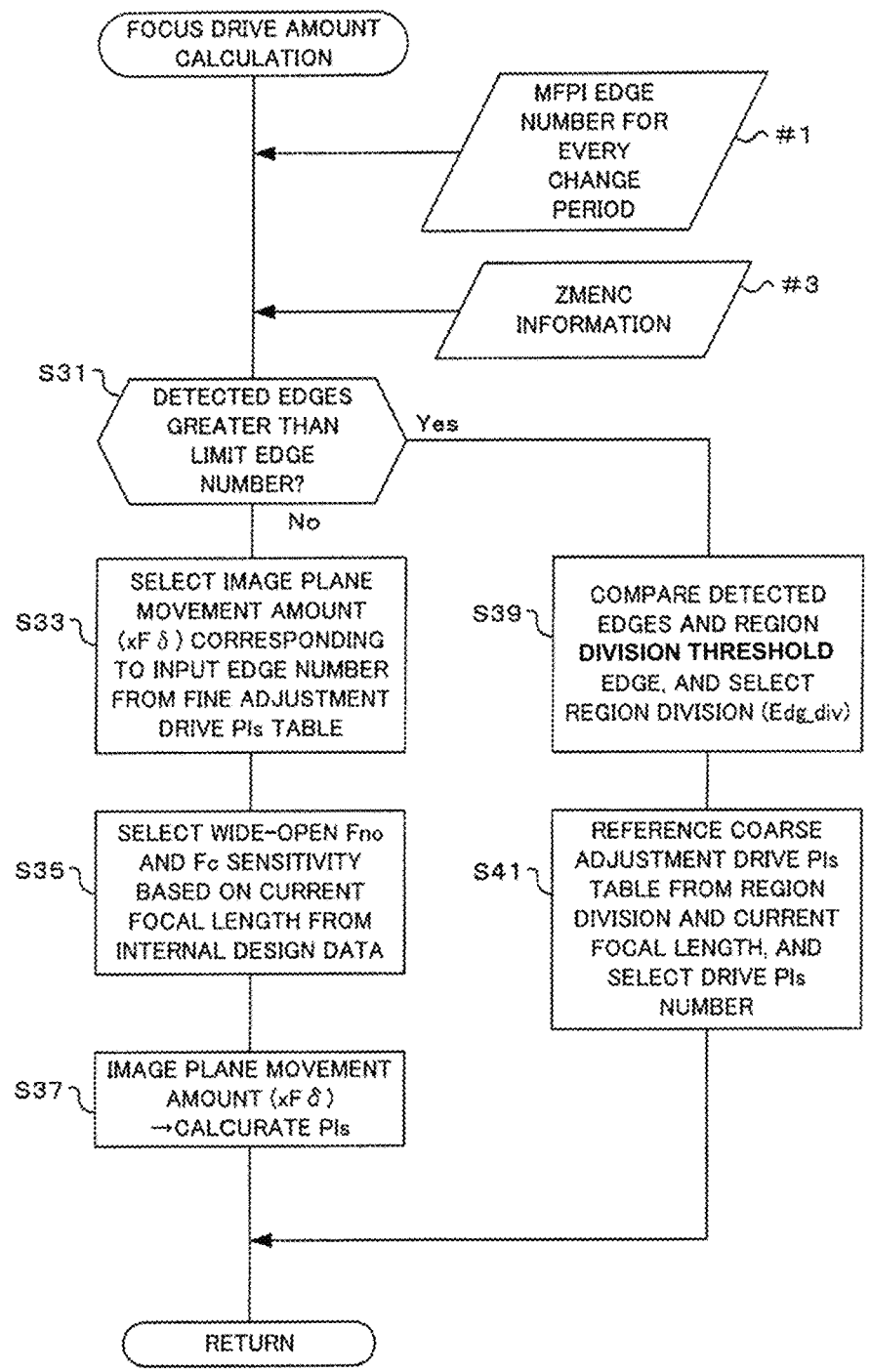
FIG. 8 is a flowchart showing a focus drive amount calculation operation, in the camera of one embodiment of the present invention.

The CPU 41 also functions as a controller for, when rotation velocity that has been detected by the rotation velocity detector is smaller than a specified value (for example, S31 in FIG. 8), setting movement amount of the focus adjustment lens constituting a specified image plane movement amount with respect to unit rotation amount of the ring member, based on a relationship stored in the memory (for example, refer to S33 to S37 in FIG. 8, and FIG. 4A).

The CPU 41 also functions as a controller for setting movement amount of the focus adjustment lens constituting a specified image plane movement amount with respect to unit rotation amount of the ring member, based on the relationship that has been stored in the memory in accordance with focal length set using a focal length setting section (refer, for example, to F309 in FIG. 4A and S33 to S37 in FIG. 8 etc.).

The CPU 41 also functions as a controller for setting specified movement amount with respect to rotation velocity of the ring member, based on a relationship stored in the memory, and controlling movement of the focus adjustment lens in accordance with rotation amount and rotation direction of the ring member, based on the movement amount (refer, for example, to FIG. 5, and S39 and S41 in FIG. 8).

The CPU 41 also functions as a controller for, when rotation velocity that has been detected by the rotation velocity detector is larger than a specified value (for example, S31 in FIG. 8), setting specified movement amount with respect to rotation velocity of the ring member, based on a relationship stored in the memory (for example, refer to S39 and S41 in FIG. 8).

An image sensor 201, a CPU 203 within a controller, a memory 205 and an input unit 207 are arranged inside the camera body 200. This image sensor 201 is arranged close to an image forming position of the photographing lens 11, a subject image formed by the photographing lens 11 is subjected to photoelectric conversion, and image data is output. The CPU 203 also carries out communication with the CPU 41 within the interchangeable lens 100. The memory 205 has programs for overall control of the camera system, and the CPU 203 carries out overall control of the camera system. The input unit 207 comprises various operation members such as a release button, cross-shaped button etc.

Next, the detailed electrical structure will be described using FIG. 2. As described previously, the CPU 41 is capable of communication with the camera body 200. The CPU 41 is also connected to a motor driver 71, and this motor driver 71 carries out drive of an FCPI 69, LDMT 73, AVMT 75 and AVPI 77.

The FCPI 69 is a photo interrupter for reference position detection of the focus lens 11b, and output of this FCPI 69 is connected to an FCPI binarization circuit 67. The FCPI 69 and the FCPI binarization circuit 67 function as the previously described focus lens reference position detector 27.

The LDMT 73 is an LD motor (lens drive motor), and functions as the previously described focus actuator within the focus lens drive mechanism 25. In this embodiment a stepping motor is adopted as the LD motor, but it is also possible to use another motor such as a common VCM (voice coil motor), for example. The AVMT 75 is an aperture motor, and functions as the previously described aperture actuator within the aperture drive mechanism 21.

The AVPI 77 is a photo interrupter for reference position detection of the aperture 13, and output of this AVPI 77 is connected to an AVPI binarization circuit 79. The AVPI 77 and AVPI binarization circuit 79 correspond to the previously described aperture reference position detector 23.

An MFPI driver 65 is a driver for the MFPI 63 for detecting turning of the range ring 51 in a case where the range ring 51 has been slid to the MF position. The MFPI 63 is provided at two locations along the turning direction of the light shielding blades. The MFPI 63 installation locations are in a positional relationship such that a phase difference between signals from two MFPIs 63 is 90 degrees. If a rotation operation of the range ring 51 has been performed by the user, the light shielding blades move in unison, and as a result of this movement of the light shielding blades the MFPIs 63 are put in a light shielding state and a light passing state, and pulse signals are output from the two MFPIs 63 that are 90 degrees apart.

Outputs of this MFPIs 63 are connected to an MFPI binarization circuit 61, and binarized by the MFPI binarization circuit 61. The MFPI binarization circuit 61, MFPI 63, and MFPI driver 65 function as the previously described MF position detector 35. Pulse signals from the MFPI 63 that have been binarized are output to the CPU 41, pulses corresponding to rotation velocity of the range ring 51 are counted by a two phase counter within the CPU 41, and rotation direction is also detected. In this specification, a number of pulses that have been counted within an observation (for example, 30 ms), is called "edge input number". As will be described later, this edge input number is used when calculating drive pulse number (Pls number) of a stepping motor, when driving the focus lens 11b using the LDMT 73.

A linear encoder RF position detector 81 is a linear encoder for detecting absolute value for rotation direction of the range ring 51, in a case where the range ring 51 has been slid to the RF position. The linear encoder RF position detector 81 is provided so that a detection contact moves in accordance with turning of the range ring 51, and outputs an analog signal in accordance with absolute position of the range ring 51 in the turning direction. An A/D converter 43 is provided within the CPU 41, and converts analog signals from the linear encoder RF position detector 81 to digital signals. AD conversion values from the A/D converter 43 represent subject distance that has been set by the user (sometimes referred to as RF linear encoder AD).

The linear encoder ZM position detector 82 is an encoder for detecting absolute value for the zoom ring 52 in the rotation direction. The linear encoder ZM position detector 82 is provided along the turning direction of the zoom ring 52, and outputs an analog signal in accordance with an absolute position of the zoom ring 52 in the rotation direction. The A/D converter 44 is provided within the CPU 41, and converts analog signals from the linear encoder ZM position detector 82 to digital signals. AD conversion values from the A/D converter 44 represent focal length that has been set by the user.

An RF/MF mode detection switch (SW) 83 is a switch for detecting whether the range ring 51 has been set to the RF mode or set to the MF mode (non-RF mode). This RF/MF mode detection SW 83 detects position of the range ring 51 in the optical axis direction, and is turned on or off when RF mode is set or when MF mode is set, and this on-off state is output to the CPU 41.

Next, manual focus control of this embodiment will be described. As was described previously, in the case of a zoom lens, Pls number for driving the focus lens 11b from the infinity end to the close up end differs depending on the zoom state (focal length) of the photographing lens. Generally, stroke pulse number (Pls number corresponding to from the infinity end to the close up end) is less the shorter the focal length, and stroke pulse number is higher if focal length is long. Pls number is calculated by multiplying edge input number from the MFPI 63, generated by a rotation operation of the range ring 51, by a proportionality coefficient, and drive control of the LDMT 73, being a lens drive motor, is carried out using this Pls number. As a result, image plane movement velocity at the wide-angle side becomes fast, while image plane movement velocity at the telephoto side becomes slow.

Also, wide-open aperture value (FNo) varies depending on the zoom state, and if the wide-open aperture value is changed a permissible depth is changed. Also, focus sensitivity Fc varies depending on Zoom state, and if the focus sensitivity changes, Pls number corresponding to permissible depth changes. As a result, Pls number corresponding to permissible depth changes depending on the zoom state. Permissible depth can be represented by equation (1) below, and image plane movement amount (Defµm) can be represented by the equation (2). [ ] Represents units.

$$\text{permissible depth } [\mu m] = FNo \times \delta [\mu m] \quad (1)$$

$$\text{image plane movement amount } [\mu m] = Fc \text{ sensitivity} [\mu m/\mu m] \times Pls [\mu m] \quad (2)$$

Pls represents pulse number, units for Fc sensitivity are represented by [µ/Pls], and equation (2) is given as equation (3).

$$\text{image plane movement amount } [\mu m] = Fc \text{ sensitivity} [\mu m/Pls] \times Pls [Pls] \quad (3)$$

From the equations (1) and (2), it will be understood that if zoom state differs, Pls number within depth of field will differ. Generally, since Pls number within depth of field for the wide-angle side is more than the Pls number within depth of field for the telephoto side, at the telephoto side variation when operating the range ring 51 is large and it is difficult to focus. In equation (1), δ represents permissible circle of confusion and is, for example, 10 µm, and permissible depth becomes a value calculated by multiplying wide-open aperture value (FNo) by δ. Also, image plane movement amount in equation (2) is represented by Defµm or Defmm, with Defµm being image plane movement amount represented in micrometer units, and Defmm being image plane movement amount represented in millimeter units.

With this embodiment, by correcting stroke pulse number, FNo and Fc sensitivity in accordance with zoom position, a constant amount of image plane movement variation is provided for operation of a fixed amount, and operating sensitivity for manual focus is improved.

Figure 3:
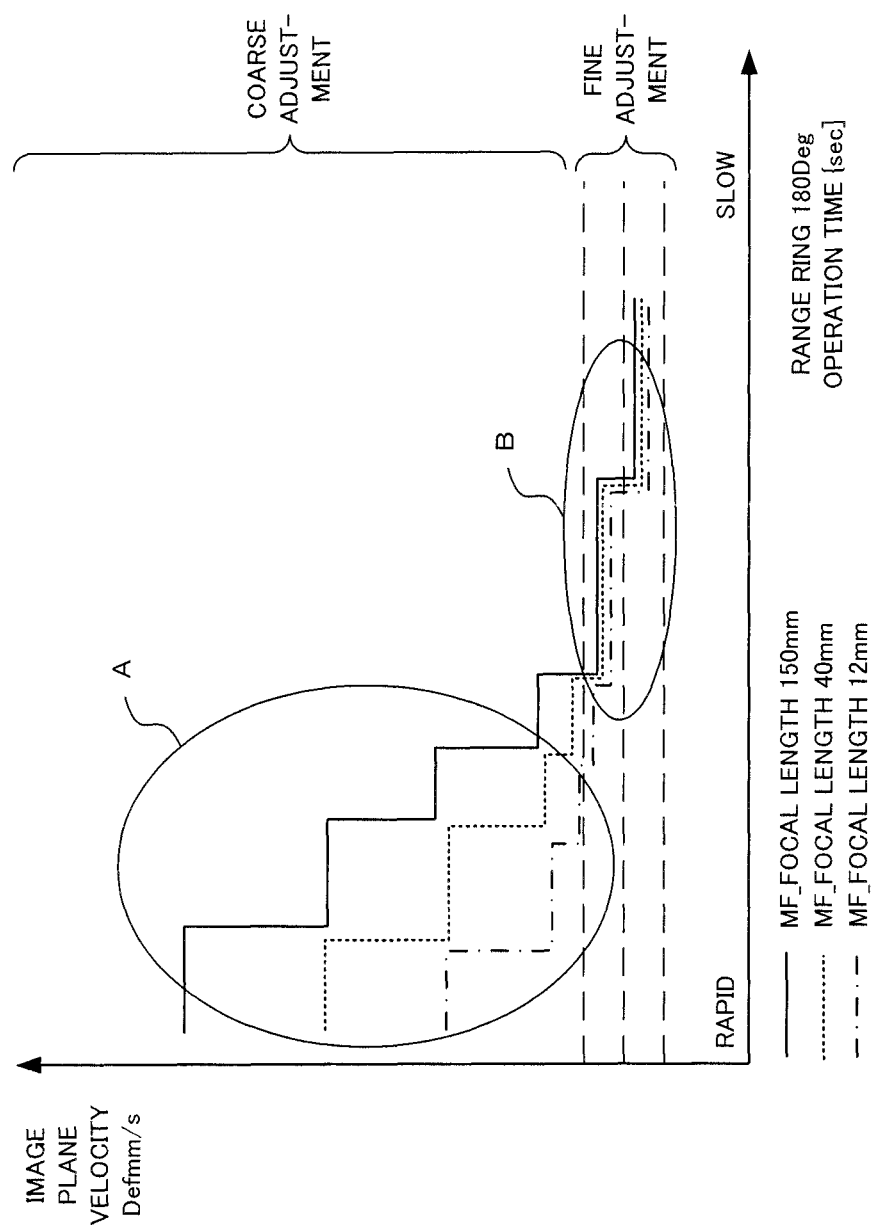
FIG. 3 is a graph showing a relationship between MF (manual focus) ring operation time and image plane movement velocity, in the camera of one embodiment of the present invention.

FIG. 3 shows a relationship between MF (manual focus) ring (range ring) operation time and image plane movement velocity, in the case of carrying out the manual focus control of this embodiment. Specifically, the axis of abscissas is time required in a case where the range ring 51 is rotated 180 degrees, and this corresponds to rotation velocity. On the axis of abscissas of FIG. 3, it is shown that rotation operation is slower towards the right side, and that rotation operation is faster towards the left side. Also, the axis of ordinates represents image plane movement velocity set for a rotation operation time of the range ring 51. The image plane movement velocity is movement velocity of an imaging plane at the image sensor 201 side, in a case where the focus lens 11b has been moved by the LDMT 73, being a lens drive motor. In FIG. 3 cases where focal length is 150 mm, 40 mm and 12 mm are shown as examples.

As will be understood from FIG. 3, an A region where the range ring 51 is being operated rapidly is a region of coarse adjustment control, and a B region where the range ring 51 is being operated slowly is a region of fine adjustment control. With coarse adjustment control, taking into consideration the fact that stroke Pls differs depending on focal length, and that image plane movement amount corresponding to stroke also differs, image plane velocity is controlled so that an amount of variation in subject distance being focused on becomes the same for the same range ring operation time. This means that control is performed so that at the telephoto side (long focus side) image plane velocity becomes faster, while at the wide-angle side (short focus side) the image plane velocity becomes slower.

This means that with coarse adjustment control, if rotation velocity of the range ring 51 is the same (input edge number is the same), then movement amount of the focus lens 11b will be the same regardless of the focal length. Specifically, in a case where the range ring 51 is rotated by, for example, 180°, then regardless of the focal length, the focus lens 11b will be moved from the infinity end to the close up end of the movable range. In other words, drive Pls number is controlled so that rotation velocity of the range ring 51, and an amount that represents movement amount of the focus lens 11b in the form of a reciprocal of distance, become 1:1.

Also, with fine adjustment control, control is performed so that image plane movement amount (xFδ) per single edge due to rotation of the range ring 51 becomes a constant amount. Here, F is wide-open aperture value (FNo), δ is permissible circle of confusion, and x is a value, and if x is set to x=1, for example, image plane movement amount corresponding to a single edge will become 1Fδ, and become movement amount of half of the permissible depth. In this way, at the time of control, drive Pls number is set assuming image plane movement amount (Defµm) as drive units. As long as movement of image plane is within permissible depth, focus is achieved, and so at the time of fine adjustment control, control is performed to make setting value x 1 or less, assuming image plane movement amount corresponding to within permissible depth (±1Fδ). For example, when it is desired to have image plane movement amount being set to ⅓ of permissible depth±1Fδ(2Fδ in a range), 0.67Fδ is taken as image plane movement amount for drive corresponding to a single edge. Control is performed so as to drive 0.67Fδ for a single edge, regardless of FNo and Fc sensitivity.

At the coarse adjustment side of FIG. 3, the image plane movement velocity becomes stepped. This is because if difference in velocity between coarse adjustment and fine adjustment becomes too large, it will be difficult to carry out a focus operation with a large variation in velocity at the point of crossover between coarse and fine adjustment, and so smooth variation in velocity close to the point of crossover is achieved by providing an intermediate velocity. If division number is increased, it is possible to carry out finer control. Also, if image plane movement velocity is calculated with arithmetic equations, the image plane movement velocity can be calculated continuously.

Manual focus control will be described in detail later using FIG. 4A to FIG. 8, but will be briefly described the following.

(1) PI edges input by the MFPI 63 are counted by the CPU 41 every MFPI observation period (update cycle). This count value is the input edge number.

(2) A conditional branch is performed depending on the input edge number, and processing for either coarse adjustment control or fine adjustment control is carried out. For example, fine adjustment is determined if the input edge number is 1-3 edges, while coarse adjustment is determined for 4 or more edges.

(3) In the case of coarse adjustment control, drive Pls number is controlled so that rotation velocity of the range ring 51, and an amount that represents movement amount of the focus lens 11*b* in the form of a reciprocal of distance, becomes 1:1.

(3-1) A difference in stroke pulses that vary in accordance with focal length is corrected using focal length ZMENC that has been acquired from the linear encoder ZM position detector 82 detecting focal length.

(3-2) Focal point magnification factor (operation amount between wide-angle side and telephoto side, or magnification factor that has been designated for every photographing lens barrel type) is also corrected.

(4) In the case of fine adjustment control, drive of the focus lens is performed by controlling drive Pls number so that image plane is moved by a predetermined image plane movement amount (Defmm) in accordance with a single edge of input edges.

(4-1) Fc sensitivity is corrected using focal length ZMENC. Specifically, Fc sensitivity that varies in accordance with focal length is corrected using ZMENC information, and image plane movement amount corresponding to a single edge is calculated from Defµm=Fc×Pls.

(4-2) Wide-open Fno is corrected using focal length ZMENC. FNo that varies in accordance with focal length is corrected using ZMENC information, and in a case of shooting with stopped-down aperture also, the aperture is set to the wide-open Fno when carrying out an MF operation.

Drive of the focus lens 11*b* is carried out with Pls number corresponding to input edge number that has been obtained in (2) above as target Pls.

Next, fine adjustment drive control will be described using FIG. 4A and FIG. 4B. FIG. 4A shows an overview of processing for fine adjustment drive. First input edge number X [edge] is acquired (F301). Here, a pulse signal from the MFPI 63 generated in accordance with rotation operation of the range ring 51 is binarized and counted.

Once the input edge number C has been acquired, next search 1 is carried out (F303). Here, the Table_Fd table (F321) storing fine adjustment drive Pls is referenced, and image plane movement amount X corresponding to input edge number X is retrieved. The Table_Fd table is stored in the memory 37, and as shown in FIG. 4B an image plane movement amount [µm] is stored for every input edge X [edge]. This image plane movement amount is a result of calculating [setting value for setting image plane movement amount for which movement is desired]×δ, and is stored in [µm] units.

Once image plane movement amount Xa has been retrieved using search 1, next a wide-open aperture value corresponding to current focal length is read out from the wide-open Fno table that stores wide-open aperture values for every focal length (F323). The wide-open Fno table is stored in the memory 37. Once wide-open aperture value has been read out, image plane movement amount Xb is calculated by computing equation (4) below (F305, F307).

$$Xa \times \text{wide-open } Fno \rightarrow Xb \text{ [µm]} \quad (4)$$

Once image plane movement amount Xb has been calculated using calculation 1, next Fc sensitivity corresponding to the current focal length is read out from the Fc sensitivity table that stores Fc sensitivity for every focal length (F325). The Fc sensitivity table is stored in the memory 37. Once Fc sensitivity has been read out, Xc, which is drive Pls, is calculated by performing calculation of equation (5) below (F309, F311).

$$Xb/Fc \text{ sensitivity} \rightarrow Xc[\text{Pls}] \quad (5)$$

In a case where input edge number is less than or equal to a specified number (for example, less than or equal to 2), fine adjustment drive is performed, and drive of the focus lens 11*b* is carried out by the lens drive motor LDMT 73, based on Xc, being drive Pls number that has been calculated using calculation 2.

Next, coarse adjustment drive control will be described. FIG. 5 shows an overview of processing for coarse adjustment drive. First, input edge number X [edge] is acquired, similarly to the case for fine adjustment drive (F331).

Once input edge number X has been input, a region division threshold edge table (F341) is referenced, and branch 1 is carried out (F333). The region division threshold edge (Edg_div_thresh1~3) table is stored in the memory 37. This table stores threshold values for region division in accordance with input edge number X, and at branch 1 threshold values stored in this table are referenced and branching is performed. For example, if input edge number is 3 to 6 the region is made of region 1 (if input edge number is 2 or less fine adjustment drive is carried out), if input edge number is 7 to 10 the region is made of region 2, and if input edge number is 10 to 14 the region is made of region 3 . . . .

Once branch 1 has been carried out, reference table selection is carried out (F335). Since a region corresponding to input edge number X is determined using region division threshold edge, a reference table corresponding to this region (Edg_div1~4) is selected.

One selection of the referenced table (Edg_div1~4) has been carried out, search 1 is carried out using a Table_Edge_div table (F343) storing coarse adjustment drive Pls number for every focal length (F337). Selected Edg_div1~4 and Pls numbers for carrying out coarse adjustment drive for every focal length are stored in this Table_Edge_div table. Accordingly, with search 1 a drive Pls number corresponding to focal length, and in a region corresponding to input edge number X, is retrieved from the table.

Xd, which is drive Pls number, is retrieved by search 1 (F339). Coarse adjustment drive of the focus lens 11*b* is carried out by the lens drive motor LDMT 73 using this XD, being drive Pls number.

Figure 6:
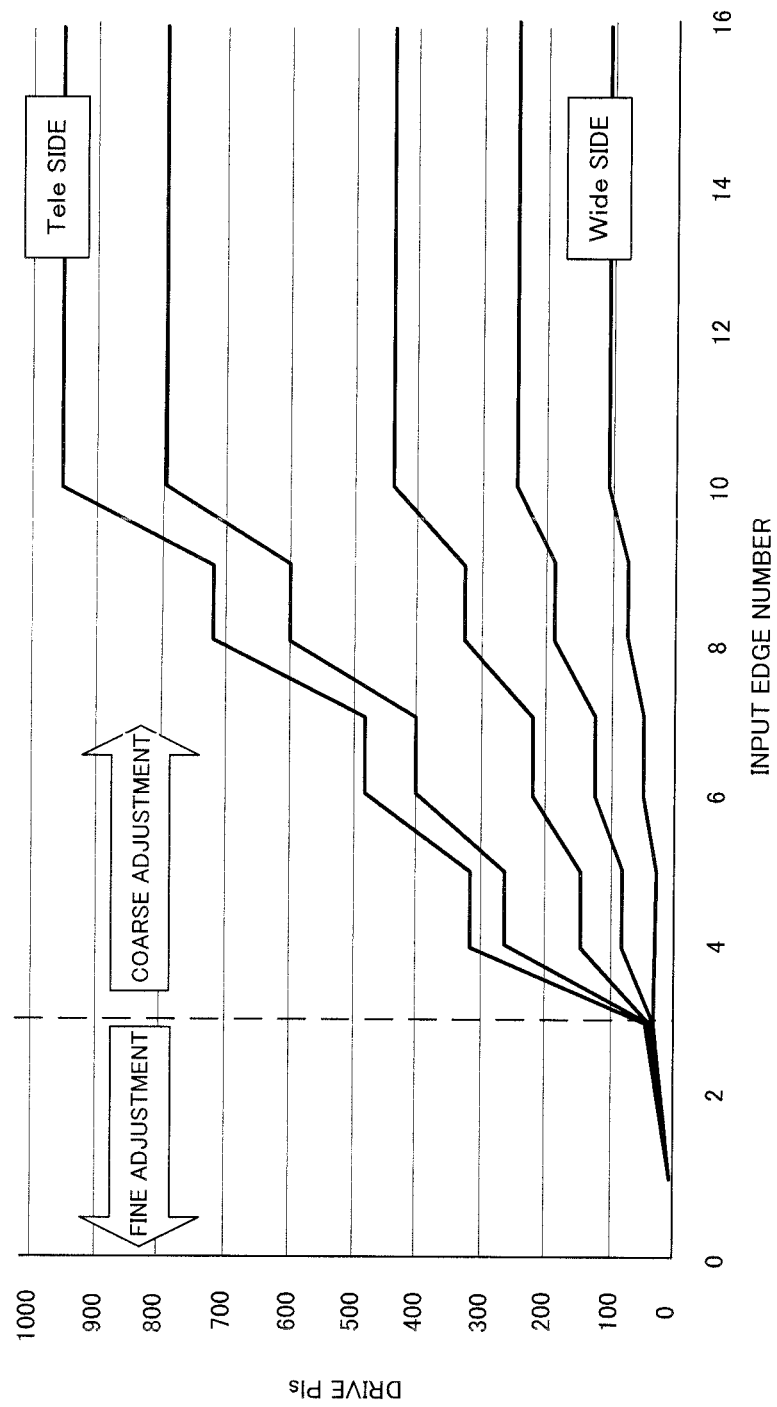
FIG. 6 is a graph showing a relationship between MF ring rotation velocity (input edge number) and focus lens drive amount (drive Pls number), for every focal length, in the camera of one embodiment of the present invention.

FIG. 6 shows drive Pls number for fine adjustment drive and coarse adjustment drive that have been described using FIG. 4A, FIG. 4B, and FIG. 5. Input edge number on the axis of abscissas is a count value of pulse signals from the MFPI 63 when the range ring 51 has been subjected to a rotation operation, and corresponds to rotation velocity of the range ring 51. The axis of ordinates is drive Pls number corresponding to input edge number, and shows drive amount for the lens drive motor LDMT 73. FIG. 6 shows drive Pls number for every focal length of the zoom lens. Since it is a zoom lens, focal length changes continuously, but in FIG. 6 only examples of five of these focal lengths are shown. While focal length changes continuously, in order to reduce storage capacity tables corresponding to focal length, such as the wide-open Fno table, Fc sensitivity table and Table_Edge_div table, store focal length divided into regions.

Next, operation for manual focus will be described using the flowcharts shown in FIG. 7 and FIG. 8. These flowcharts are executed by the CPU 41 controlling each section within the interchangeable lens 100 in accordance with programs stored in the memory 37.

Figure 7:
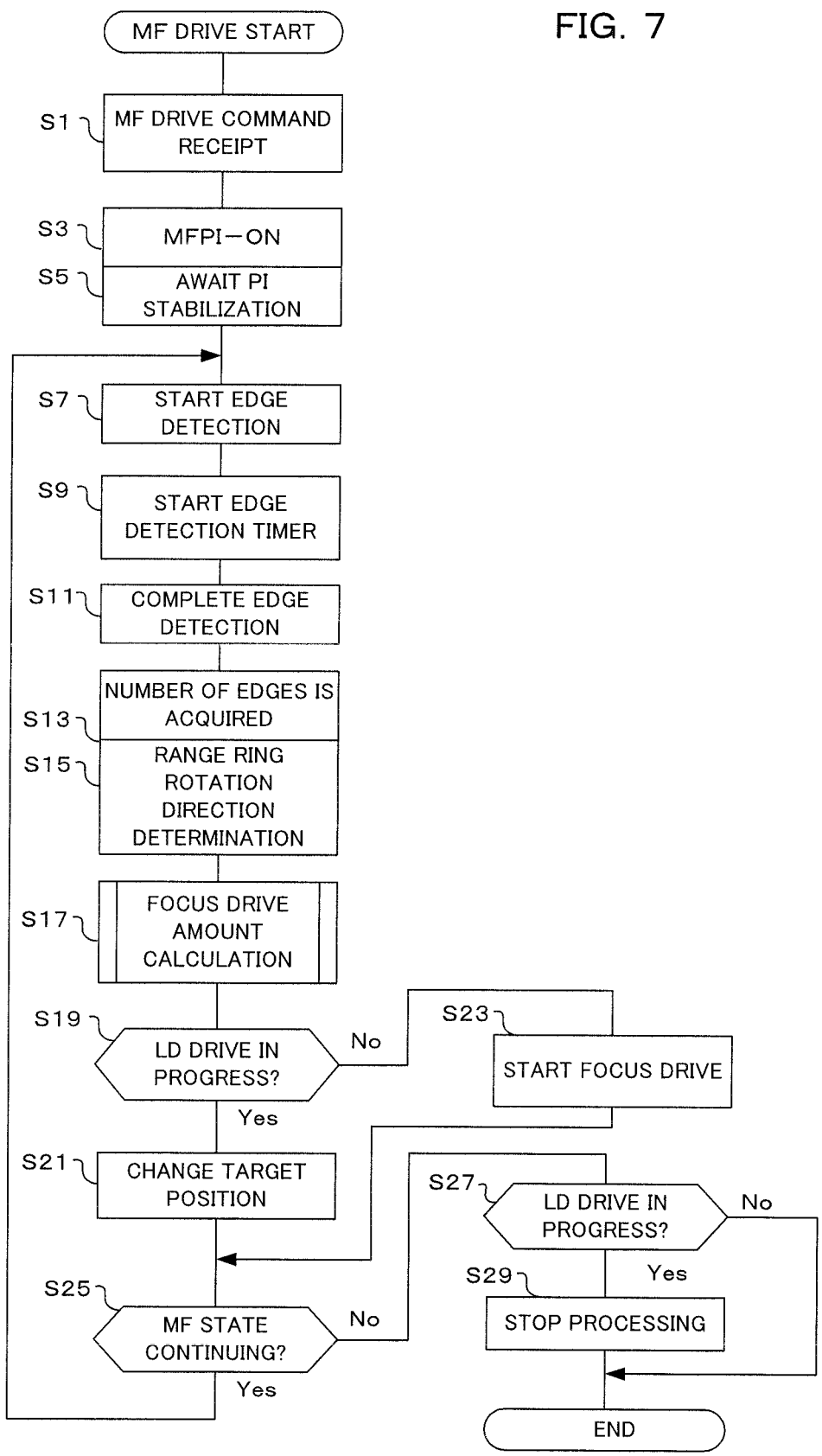
FIG. 7 is a flowchart showing MF drive operation, in the camera of one embodiment of the present invention.

If the flow for MF drive shown in FIG. 7 is commenced, first an MS drive command is received from the CPU 203 within the body unit 200 (S1). In a state where MF mode has been set by sliding the range ring 51 and the fact that the range ring 51 is set at the non RF position (MF position) has been detected by the RF mode detector 33, receipt of an MF drive command from the CPU 203 is awaited. AF operation is possible even in a state where the range ring 51 is set to the MF position, with AF operation being executed upon receipt of an AF drive command from the CPU 203, while MF operation becomes possible upon receipt of an MF drive command.

If MF Drive command is received, the MFPI 63 is turned on (S3), and stabilization of the PI is awaited (S5). With MF mode, since drive control of the focus lens 11b is carried out in accordance with a pulse signal of the MFPI 63 generated in accordance with the rotation operation of the range ring 51, in this step there is a wait until the MFPI 63 for detecting a rotation operation of the range ring 51 is placed in an operating state and the output signal stabilizes.

Once output of the MFPI 63 has stabilized, next edge detection (detection of input edge number) is commenced (S7). Two MFPIs 63 are provided, and once outputs from respective PIs (photo interrupters) have stabilized the MFPI binarization circuit 61 binarizes a pulse signal, and it is possible to detect a time of switching from H level to L level, or from L level to H level, as an edge. Since output of the MFPI binarization circuit 61 is connected to a counter of the CPU 41, a number of edges is counted by this counter.

Once edge detection has commenced, timer operation of an edge detection timer is started (S9), and once an MFPI observation period (update cycle) elapses, edge detection is completed (S11).

If edge detection is completed, number of edges is acquired (S13) and range ring rotation direction determination is carried out (S15). As was described previously, the counter within the CPU 41 counts a number of edges, and so a count value at the time of edge detection is acquired as the number of edges. Also, two of the MFPIs 63 provided so that the phase difference between pulse signals is 90°. Rotation direction of the range ring 51 is determined by determining which of these two pulse signals is ahead.

Once range ring rotation direction determination has been carried out, next focus drive amount calculation is carried out (S17). Here, it is determined whether fine adjustment control will be carried out or coarse adjustment control will be carried out based on the number of edges that was acquired in step S13, and focus drive amount (Pls number) is calculated based on the result of this determination. Detailed operation of this focus drive amount calculation will be described later using FIG. 8.

If focus drive amount calculation has been carried out, next it is determined whether or not LD drive is in progress (S19). It is determined whether or not LD drive, specifically drive of the focus lens 11b, is in progress. If the result of this determination is that drive of the focus lens 11b is not being carried out, focus drive is started (S23). Here, the CPU 41 commences drive in accordance with focus drive (Pls number) that was calculated in step S17, for the lens drive motor LDMT 73 by means of the motor driver 71.

On the other hand, if the result of determination in step S19 is that drive of the focus lens 11b is in progress, update of target position is carried out (S21). Since focus drive amount is calculated by acquiring number of edges for every MFPI observation period, in this step update of target position is carried out in accordance with a newly calculated focus drive amount (Pls number).

If focus drive has been commenced in step S23, or if update to target position has been carried out in step S21, it is next determined whether or not the MF state is ongoing (S25). The MF state means a state where the range ring 51 is being subjected to a rotation operation, and whether or not input edges are being input is detected, and it is determined that the MF state is ongoing if input of input edges is continuing. If the result of this determination is that the MF state is ongoing, processing returns to step S7, and the previously described operation is repeated.

On the other hand, if the result of determination in step S25 is that the MF state is not ongoing, then similarly to step S19, it is determined whether or not LD drive is in progress (S27). If the result of this determination is that drive of the focus lens 11b is in progress, stop processing is carried out (S29). Here, the CPU 41 stops drive of the lens drive motor LDMT 73 by means of the motor driver 71.

If the result of determination in step S27 is that drive of the focus lens 11b is not in progress, or if stop processing has been carried out in step S29, the flow for MF drive is completed.

Next, the focus drive amount calculation operation of step S17 will be described using the flowchart shown in FIG. 8. When processing this flow, reference is made to MFPI number of edges every update period (#1), and to ZMENC information (#3). Of these, the MFPI number of edges every update period is the number of edges that was acquired in step S13, and is temporarily stored in the memory 37. Also, ZMENC information is current focal length information, that is output from a linear encoder ZM position detector 82, converted to digital values by the A/D converter 44 and temporarily stored in the memory 37.

If the flow for focus drive amount calculation shown in FIG. 8 is commenced, it is first determined whether or not the detected number of edges is greater than a limit number of edges (S31). Here, determination is performed by comparing the MFPI number of edges for every update period, that was acquired in step S13 and temporarily stored, and a threshold value (limit number of edges) for branching to coarse adjustment fine adjustment. This threshold value (limit number of edges) is stored in the memory 37.

If the result of determination in step S31 is that the detected number of edges is greater than the limit number of edges, coarse adjustment control is carried out steps S39 and S41. First, the detected number of edges and a region division threshold edge are detected, and an appropriate region division (Edg_div) is selected (S39). Here, processing in "branch 1 (F333)" that was described using FIG. 5 is carried out, comparison is made with region division threshold edge (Edg_div_thresh1~3) based on detected number of edges (in FIG. 5, input edge number X), and selection of region division (in FIG. 5, selection of one of the reference tables (Edg_div1~4)) is carried out.

If selection of region division has been carried out in step S39, a coarse adjustment drive Pls table is referenced from region division (Edg_div) and focal length (ZMENC), and drive Pls number is selected (S41). Here the processing of "search 1 (F337)" of FIG. 5 is carried out. Specifically, drive Pls number is selected using region division (Edg_div) and focal length (ZMENC) information, from the coarse adjustment drive Pls table (Table_edg_div (343)). This selected drive Pls number becomes drive amount when carrying out coarse adjustment drive.

On the other hand, if the result of determination in step S31 is that the detected number of edges is not greater than the limit number of edges, fine adjustment control is carried out steps S33 to S37. First, an image plane movement amount (xFδ) corresponding to input edge number is selected from the fine adjustment drive Pls table (S33). The processing of "search 1 (F303)" in FIG. 4A is carried out. Specifically, the Table_Fd table (F321 in FIG. 4A) storing fine adjustment drive Pls is referenced based on MFPI number of edges (input edge number) for every update period that was acquired in step S13 and temporarily stored, and image plane movement amount (xFδ) corresponding to input edge number X (Xa in FIG. 4A) is selected.

Once the image plane movement amount (xFδ) has been selected, next wide-open Fno and FC sensitivity that are based on the current focal length information are selected from internal design data (S35). Here "calculation 1 (F305)" in FIG. 4A is processed. Specifically, since wide-open FNo and Fc sensitivity differ for every focal length (ZMENC), the wide-open Fno table (F323 in FIG. 4A) is selected based on current focal length information ZMENC information that was acquired in #3. Together with this Fc sensitivity corresponding to the current focal length is selected from the Fc sensitivity table (F325 in FIG. 4A).

If wide-open Fno and Fc sensitivity have been selected, drive Pls number is calculated from image plane movement amount (xFδ) (S37). Here, the image plane movement amount (F307) of FIG. 4A is obtained, and further, processing of calculation 2 (F309) is carried out. Specifically, image plane movement amount (xFδ) is calculated from previously described equation (3), and drive Pls number is calculated from previously described equation (4) using this image plane movement amount (image plane movement amount is substituted for Xb in equation (4)).

If drive Pls number has been obtained in step S37 or S41, the flow for focus drive amount calculation is completed and the originating processing flow is returned to.

In this way, with the one embodiment of the present invention, input edge number corresponding to relative rotation velocity of the range ring 51 is input (S13 in FIG. 7, #1 in FIG. 8), and drive amount Pls number of the focus lens 11b is determined in accordance with current focal length (#3 in FIG. 8) and in accordance with rotation amount and rotation direction of the range ring 51 based on input edge number (S33 to S41 in FIG. 8).

In particular, in a case where rotation velocity is slower than a specified value (input edge number is small) (No at step S31 in FIG. 8), drive amount Pls that will constitute a specified image plane movement amount with respect to unit rotation amount of the range ring 51 is set (FIG. 4A, S33 to S37 in FIG. 8). As a result, rotation operation amount of the range ring 51 and image plane movement amount have a 1:1 relationship regardless of the focal length that is set.

Also, in a case where rotation velocity is faster than the specified value (input edge number is large) (Yes at S31 in FIG. 8), a specified drive amount relative to rotation velocity of the range ring 51 is set (FIGS. 5, S39 and S41 in FIG. 8). As a result, rotation operation amount of the range ring 51 and movement amount of the focus lens have a 1:1 relationship regardless of the focal length that is set. Specifically, moving the focus lens from the infinity end to the close up end takes the same rotation operation amount regardless of focal length.

Next, a modified example of the one embodiment of the present invention will be described. With the one embodiment of the present invention, the fine adjustment drive Pls table shown in FIG. 4B and the coarse adjustment drive Pls table (F343 in FIG. 5) were created in advance. As a result, movement velocity of the focus lens 11b at the time of fine adjustment and coarse adjustment drive were predetermined. It was not possible to make image plane movement velocity slightly faster or slightly slower for the same operation amount by the user. With this modified example, therefore, it is made possible to make image plane movement velocity faster or slower than a reference setting value as a result of user setting.

The Table_Fd table shown in FIG. 4B shows image plane movement amount for input edge number. FIG. 9A shows coefficients for image plane movement amount of this Table_Fd table, and they are stored in the memory 205. Image plane movement amount determined by input edge number (a1, a2 and a3 in FIG. 9A) is multiplied by a coefficient that has been set by the user. In this way, at the time of fine adjustment it is possible to speed up or slow down the standard image plane movement velocity depending on the user's preference.

The Table_Edg_div of FIG. 5 (F343) stores Pls number for carrying out coarse adjustment drive in accordance with current focal length. FIG. 9B shows coefficients for drive Pls number in this Table_Edge_div table and they are stored in the memory 205. The reference table determined by the input edge number (Edg_div1~4 in FIG. 5) is multiplied by a coefficient that has been set by the user. In this way, at the time of coarse adjustment it is possible to speed up or slow down the standard drive Pls number depending on the user's preference.

In adjusting the velocity of manual focus, as well as changing a fine adjustment table and a coarse adjustment table by multiplying by a coefficient, as was shown in FIG. 9A and FIG. 9B, it is also possible to have a separate table for every velocity, or for the user themselves to be able to set a velocity table.

Figure 10A:
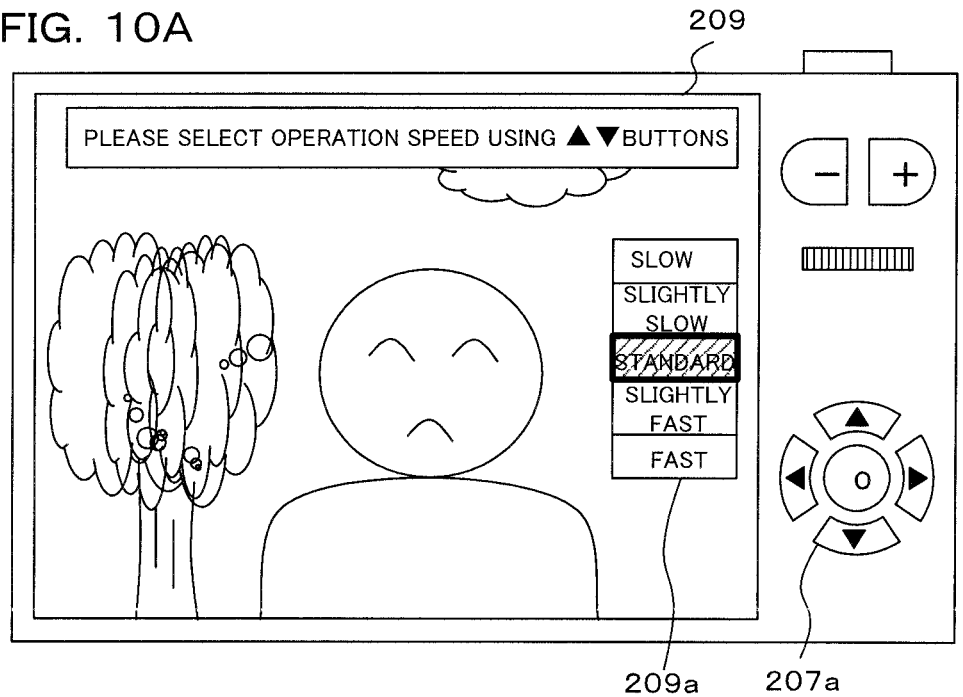
FIG. 10A and FIG. 10B are drawings showing examples of setting screens for changing MF operation velocity, in the modified example of the camera of one embodiment of the present invention.
Figure 10B:
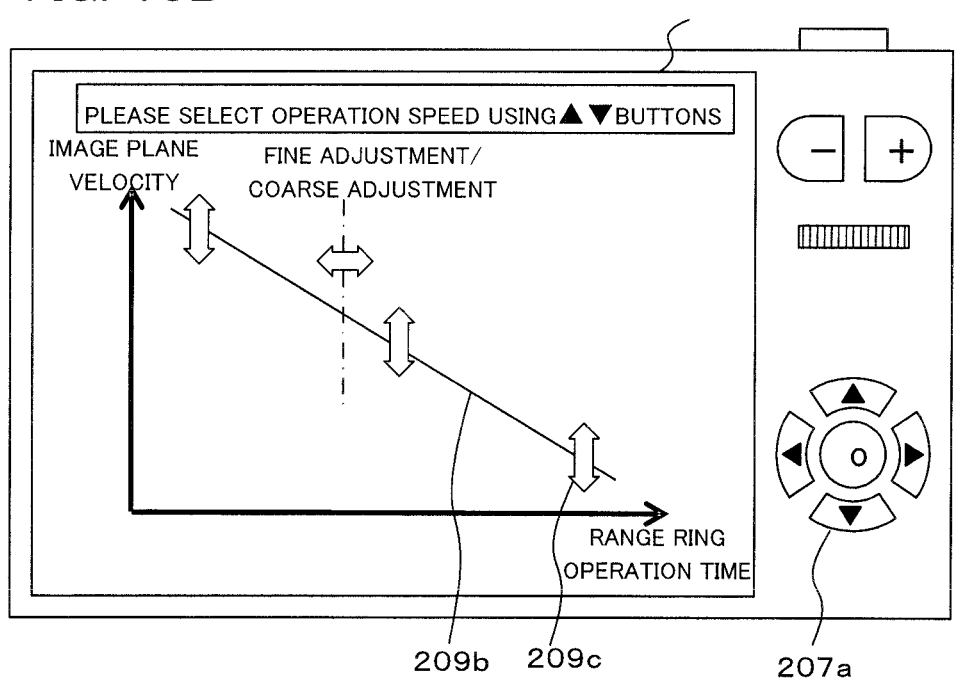

Next, an input method for carrying out velocity setting at the time of fine adjustment and coarse adjustment will be described using FIG. 10A and FIG. 10B. FIG. 10A shows a first input method, and FIG. 10B shows a second input method. With the first input method, an operating velocity setting screen 209a is displayed on a display unit 209 arranged on the rear surface etc. of the camera body 200, and the users preferred operating velocity is selected by operating a cross-shaped button 207a. With the example shown in FIG. 10A, "standard" is selected as the operating velocity. Fine adjustment and coarse adjustment may be changed together, or they may be respectively set by showing a fine adjustment menu and a coarse adjustment menu separately.

As shown in FIG. 10B, with the second input method and a graph corresponding to the MF velocity table 209b for operating velocity setting is displayed on the display unit 209. The user then moves a cursor 209c on the graph corresponding to the MF velocity table 209b by operating the cross-shaped button 207a, to set a desired operating velocity. The display unit 209 may be a touch panel type, and setting may be formed by directly touching or sliding the graph corresponding to the MF velocity table 209b.

Next, operation of this modified example will be described using the flowcharts shown in FIG. 11A and FIG. 11B. The flowchart shown in FIG. 11A is executed by the CPU 203 within the controller within the camera body 200 controlling each of the sections within the camera body 200 in accordance with programs stored in the memory 205 within the camera body, while the flowchart shown in FIG. 11B is executed by the CPU 41 within interchangeable lens 100 controlling each of the sections within the interchangeable lens 100 in accordance with programs stored in the memory 37 within the camera body.

Figure 11A:
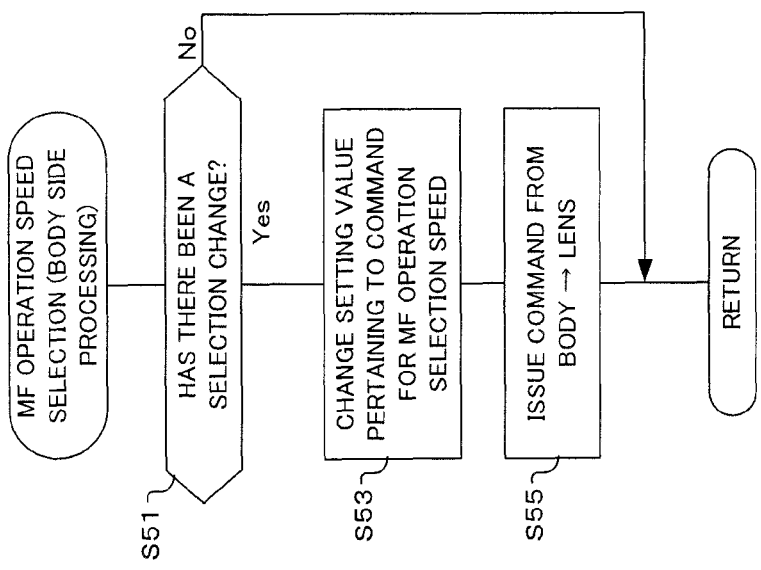
FIG. 11A and FIG. 11B are flow charts showing an MF operation velocity selection operation, in the modified example of the camera of one embodiment of the present invention.
Figure 11B:
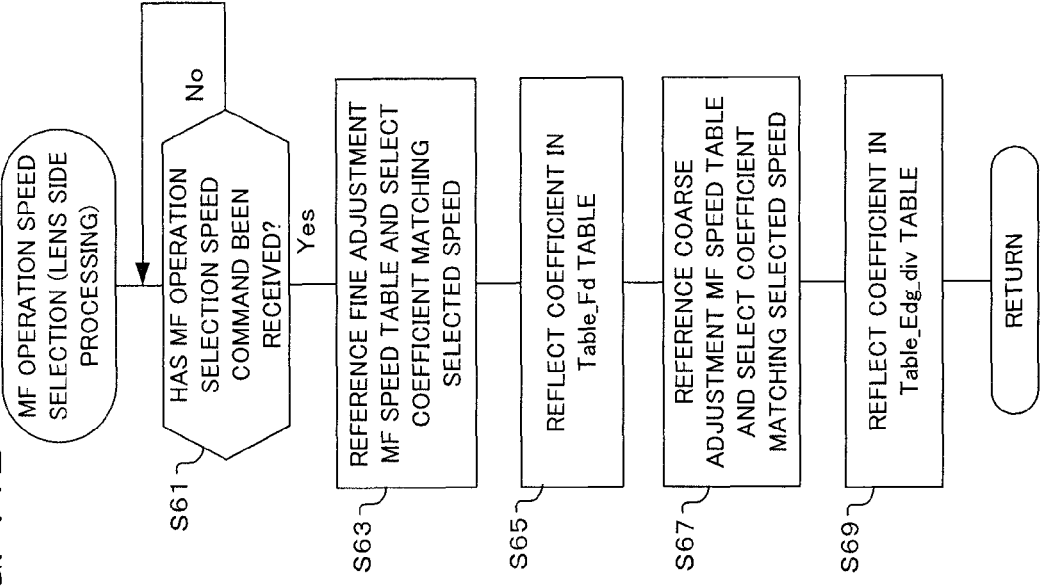

If the flow for camera body side MF operation velocity selection shown in FIG. 11A is entered, it is first determined whether or not selection change has been carried out (S51).

As has been described using FIG. 9A and FIG. 9B, since the user sets change of operation velocity using input screens etc., in this step determination is based on whether or not this operation has been performed.

If the result of determination in step S51 is that selection change has not been carried out, a setting value pertaining to an MF operation selection velocity command is changed (S53). Here, a setting value pertaining to a command corresponding to coefficients as shown in FIG. 9A and FIG. 9B etc. is changed in accordance with the setting in step S51.

Once change to setting value pertaining to a command has been carried out, next the command is transmitted from the camera body 200 to the interchangeable lens 100 (S55). Here, a command parameter that has been changed in step S53 is transmitted to the interchangeable lens 100 by means of communication between the camera body and the interchangeable lens. Once the command has been issued, or if the result of determination in step S51 was that there was no selection change, the camera body side MF operation velocity selection flow is completed.

If the interchangeable lens side MF operation velocity selection flow shown in FIG. 11B is entered, it is first determined whether or not an MF operation selection velocity command has been received (S61). As was described previously, in a case where change to MF operation velocity has been performed, then in step S55, since an MF operation selection velocity command is transmitted from the camera body side to the interchangeable lens side, in this step is determined whether or not this command has been received. If the result of this determination is that a command has not been received, a standby state is entered.

If the result of determination in step S61 is that the MF operation selection velocity command has been received, a fine adjustment MF velocity table is referenced, and a coefficient that matches the selected velocity is selected (S63). Here, the coefficient is selected from the table shown in FIG. 9A in accordance with setting value pertaining to the received command.

Next, the coefficient is reflected in the Table_Fd table (S65). Here, a coefficient in accordance with the command that has been received is reflected in the fine adjustment table (Table_Fd) shown in FIG. 9A and FIG. 4A. By reflecting the coefficient it is possible to carry out change of the image plane movement velocity in S33, S35, and S37 in FIG. 8.

Next, the coarse adjustment MF velocity table is referenced and a coefficient that matches the selected glossy is selected (S67). Here, the coefficient is selected from the table shown in FIG. 9B in accordance with setting value pertaining to the received command.

Next, the coefficient is reflected in the Table_Edge_div table (S69). Here, a coefficient in accordance with the command that has been received is reflected in the coarse adjustment table (Table_Edg_div) shown in FIG. 9B and FIG. 5. By reflecting the coefficient it is possible to carry out change of the drive Pls number in S39 and S41 in FIG. 8.

Once reflecting of the coefficient has been carried out in S69, the interchangeable lens side MF operation velocity selection flow is completed.

In this way, with this modified example, there is a setting unit (refer, for example, to the operation input unit 207a) for setting a setting value for operation of the ring member (for example, range ring 51), a memory (refer, for example, to the memory 205 and the memory 37) stores a plurality of relationships between focus adjustment lens movement amount and image plane movement amount (refer, for example, to FIG. 9A and FIG. 9B), and a controller (refer, for example, to the CPU 203 the CPU 41) selects from a plurality of relationships that have been stored in the memory in accordance with setting value output from the sensing unit, and sets movement amount for the focus adjustment lens, constituting a specified image plane movement amount, with respect to unit rotation amount of the ring member, based on the selected relationship (refer, for example, to FIG. 11A and FIG. 11B). It is therefore possible to change movement velocity for fine adjustment control of the focus lens 11b in accordance with operation of the range ring in MF mode depending on setting. It is therefore possible to give an operating sensitivity corresponding to a user's individual preference Also, with this modified example, the memory (refer, for example, to the memory 205 and the memory 37) stores a plurality of relationships between rotation velocity of the ring member and movement amount of the focus adjustment lens, and the controller (refer, for example to the CPU 203 and the CPU 41) selects from the plurality of relationships that have been stored in the memory in accordance with setting value output from the setting unit, and sets the specified movement amount with respect to rotation velocity of the ring member based on the selected relationship (refer, for example to FIG. 11A and FIG. 11B). It is therefore possible to change movement velocity for coarse adjustment control of the focus lens 11b in accordance with operation of the range ring in MF mode depending on setting. It is therefore possible to give an operating sensitivity corresponding to a user's individual preference As has been described above, with the one embodiment and the modified example of the present invention, with coarse adjustment control lens drive is carried out such that a relative rotation velocity of the range ring 51 and movement amount based on lens drive amount Pls number have a 1:1 relationship. Also, with fine adjustment control, lens drive is carried out based on a lens drive amount Pls number that gives a predetermined image plane movement amount. It is therefore possible to improve operability at the time of manual focus adjustment of the photographing lens using coarse adjustment and fine adjustment.

With the one embodiment and modified example of the present invention, description has been given of an example applied to a zoom lens. The present invention is intended to achieve improvement in operability based on variation of the focal length, but in the case of being applied to a prime lens also, it is possible to improve operability by switching between fine adjustment control and coarse adjustment control.

With the one embodiment of a modified example of the present invention, both fine adjustment control and coarse adjustment are carried out, but the present invention can be applied to only one of either fine adjustment control or coarse adjustment control, and control similar to the related art may also be carried out.

Further, with this embodiments, a device for taking pictures has been described using a digital camera, but as a camera it is also possible to use a digital single lens reflex camera or a compact digital camera, or a camera for movie use such as a video camera, and further to have a camera that is incorporated into a mobile phone, a smart phone, a mobile information terminal (PDA: Personal Digital Assistant), personal computer (PC), tablet type computer, game console etc. In any event, it is possible to adopt the present invention as long as a device is for taking photographs with a manual rotation operation.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. A photographing device, comprising:
a focus adjustment lens that is capable of moving in an optical axis direction provided inside a lens barrel containing a photographing lens,
a focus ring member which is arranged to be rotatable with respect to the lens barrel,
a rotation detector for detecting rotation amount and rotation direction of the focus ring member,
a memory for storing a relationship between rotation amount of the focus ring member and image plane movement amount,
a controller for setting movement amount of the focus adjustment lens constituting a specified image plane movement amount with respect to unit rotation amount of the focus ring member, based on the relationship that is stored in the memory, and controlling movement of the focus adjustment lens in accordance with rotation amount and rotation direction of the focus ring member that have been detected by the rotation detector based on the movement amount, and
a rotation velocity detector for detecting rotation velocity of the focus ring member,
wherein
the controller, when rotation velocity that has been detected by the rotation velocity detector is smaller than a specified value, sets a movement amount of the focus adjustment lens constituting a specified image plane movement amount with respect to unit rotation amount of the focus ring member, based on a relationship between rotation amount of the focus ring member and image plane movement amount that is stored in the memory, determines movement amount of the focus adjustment lens in accordance with the rotation amount that has been detected by the rotation detector, and causes the focus adjustment lens to be moved in accordance with the determined movement amount.

2. The photographing device of claim 1, further comprising:
the photographing lens has variable focal length and is provided with a focal length setting section,
the memory stores relationships between movement amount of the focus adjustment lens corresponding to focal length of the photographing lens, and image plane movement amount, and
the controller sets movement amount of the focus adjustment lens constituting a specified image plane movement amount respect to unit rotation amount of the focus ring member, based on a relationship between movement amount of the focus adjustment lens and image plane movement amount in accordance with focal length set by the focal length setting unit, and a relationship between rotation amount of the focus ring member and image plane movement amount that has been stored in the memory.

3. The photographing device of claim 1, further comprising:
a setting section for setting of setting values for operation of the focus ring member, and wherein
the memory stores a plurality of relationships between movement amount of the focus adjustment lens and image plane movement amount, and
the controller selects from the plurality of relationships between movement amount of the focus adjustment lens and image plane movement amount that are stored in the memory in accordance with setting value output from the setting section, and sets movement amount of the focus adjustment lens constituting a specified image plane movement amount respect to unit rotation amount of the focus ring member, based on the selected relationship and a relationship between rotation amount of the focus ring member and image plane movement amount that has been stored in the memory.

4. The photographing device of claim 1,
wherein the memory stores relationships between rotation velocity of the focus ring member and movement amount of the focus adjustment lens, and
wherein the controller sets a specified movement amount with respect to rotation velocity of the focus ring member, based on the relationship between rotation velocity of the focus ring member and movement amount of the focus adjustment lens that is stored in the memory, controls movement of the focus adjustment lens in accordance with rotation amount and rotation direction of the focus ring member based on the movement amount, and when rotation velocity that has been detected by the rotation velocity detector is larger than a specified value, sets a specified movement amount with respect to rotation velocity of the focus ring member, based on a relationship between rotation velocity of the focus ring member and movement amount of the focus adjustment lens that is stored in the memory.

5. The photographing device of claim 1 wherein the relationship between the rotation amount of the focus ring member and the image plane movement amount is stored in a plurality of entries of a table stored in the memory.

6. The photographing device of claim 1, further comprising:
a zoom lens system; and
a zoom ring member provided separate from the focus ring member.

7. The photographing device of claim 1 wherein
the specified image plane movement amount is less than or equal to a permissible depth of the photographing lens with respect to unit rotation amount of the ring member.

8. The photographing device of claim 4, further comprising:
a setting section for setting of setting values for operation of the focus ring member, and wherein
the memory stores a plurality of relationships between rotation velocity of the focus ring member and movement amount of the focus adjustment lens, and
the controller selects from the plurality of relationships between rotation velocity of the focus ring member and movement amount of the focus adjustment lens that are stored in the memory in accordance with setting value output from the setting section, and sets the specified movement amount with respect to rotation velocity of the focus ring member, based on the selected relationship.

9. A control method for a photographing device that comprises a focus adjustment lens that is capable of moving in an optical axis direction provided inside a lens barrel containing a photographing lens, a focus ring member which is arranged to be rotatable with respect to the lens barrel, a rotation detector for detecting rotation amount and rotation direction of the focus ring member, and a memory for storing relationships between rotation amount of the focus ring member and image plane movement amount, comprising:
setting a movement amount of the focus adjustment lens constituting a specified image plane movement amount with respect to unit rotation amount of the focus ring member, based on a relationship that is stored in the memory, and
controlling movement of the focus adjustment lens in accordance with rotation amount and rotation direction of the focus ring member that have been detected by the rotation detector, based on the movement amount, and when rotation velocity of the focus ring member is smaller than a specified value, setting a movement amount of the focus adjustment lens constituting a specified image plane movement amount with respect to unit rotation amount of the focus ring member, based on a relationship between rotation amount of the focus ring member and image plane movement amount that is stored in the memory, determining a movement amount of the focus adjustment lens in accordance with the rotation amount that has been detected by the rotation detector, based on the movement amount that has been set, and causing the focus adjustment lens to be moved in accordance with the determined movement amount.

10. A control method for the photographing device of claim 9, wherein the photographing lens has variable focal length and is provided with a focal length setting section, and the memory stores relationships between a rotation amount of the focus ring member and image plane movement amount, wherein
movement amount of the focus adjustment lens, constituting a specified image plane movement amount with respect to unit rotation amount of the focus ring member, is set based on a relationship that has been stored in the memory in accordance with focal length set by the focal length setting section.

11. A control method for the photographing device of claim 9, the photographing device further comprising a setting section for setting of setting values for operation of the focus ring member, and wherein
the memory stores a plurality of relationships between rotation velocity of the focus ring member and movement amount of the focus adjustment lens, and
selection is made from the plurality of relationships that are stored in the memory in accordance with a setting value output from the setting section, and the specified movement amount with respect to rotation velocity of the focus ring member is set based on the selected relationship.

12. The control method of claim 9 wherein the photographing device further comprises a memory for storing relationships between rotation velocity of the focus ring member and movement amount of the focus adjustment lens, the control method further comprising:
setting a specified movement amount with respect to rotation velocity of the focus ring member, based on a relationship between rotation velocity of the focus ring member and movement amount of the focus adjustment lens that is stored in the memory; and
controlling movement of the focus adjustment lens in accordance with rotation amount and rotation direction of the focus ring member based on the movement amount, and, when rotation velocity that has been detected by the rotation velocity detector is larger than a specified value, setting a specified movement amount with respect to rotation velocity of the focus ring member, based on a relationship between rotation velocity of the focus ring member and movement amount of the focus adjustment lens that is stored in the memory.

13. The control method for the photographing device of claim 9, wherein the relationship between the rotation amount of the focus ring member and the image plane movement amount is stored in a plurality of entries of a table stored in the memory.

14. A control method for the photographing device of claim 12, wherein:
the photographing device further comprises a setting section for setting of setting values for operation of the focus ring member, and the memory stores a plurality of relationships between rotation velocity of the focus ring member and movement amount of the focus adjustment lens; and
selection is made from the plurality of relationships between rotation velocity of the focus ring member and movement amount of the focus adjustment lens that are stored in the memory in accordance with setting value output from the setting section, and the specified movement amount with respect to rotation velocity of the focus ring member is set based on the selected relationship.

15. A non-transitory computer-readable medium storing a computer program for a photographing device that comprises a focus adjustment lens that is capable of moving in an optical axis direction provided inside a lens barrel containing a photographing lens, a focus ring member which is arranged to be rotatable with respect to the lens barrel, a rotation detector for detecting rotation amount and rotation direction of the focus ring member, and a memory for storing relationships between rotation amount of the focus ring member and image plane movement amount, the computer program comprising:
setting a movement amount of the focus adjustment lens constituting a specified image plane movement amount with respect to unit rotation amount of the focus ring member, based on a relationship that is stored in the memory; and controlling movement of the focus adjustment lens in accordance with rotation amount and rotation direction of the focus ring member that have been detected by the rotation detector, based on the movement amount, and when rotation velocity of the focus ring member is smaller than a specified value, setting a movement amount of the focus adjustment lens constituting a specified image movement amount with respect to unit rotation amount of the focus ring member, based on a relationship between rotation amount of the focus ring member and image plane movement amount that is stored in the memory, determining a movement amount of the focus adjustment lens in accordance with the rotation amount that has been detected by the rotation detector, based on the movement amount that has been set, and causing the focus adjustment lens to be moved in accordance with the determined movement amount.

16. The non-transitory computer-readable medium of claim 15, wherein:
the photographing lens has variable focal length and is provided with a focal length setting section,
the memory stores relationships between a rotation amount of the focus ring member and image plane movement amount, and
movement amount of the focus adjustment lens constituting a specified image plane movement amount with respect to unit rotation amount of the focus ring member, is set based on a relationship that has been stored in the memory in accordance with focal length set by the focal length setting section.

17. The non-transitory computer-readable medium of claim 15, wherein the photographing device further includes
a setting section for setting of setting values for operation of the focus ring member, wherein
the memory stores a plurality of relationships between rotation velocity of the focus ring member and movement amount of the focus adjustment lens, and
selection is made from the plurality of relationships that are stored in the memory in accordance with a setting value output from the setting section, and the specified movement amount with respect to rotation velocity of the focus ring member is set based on the selected relationship.

18. The non-transitory computer-readable medium of claim 15 wherein the photographing device further comprises a memory for storing relationships between rotation velocity of the focus ring member and movement amount of the focus adjustment lens, the computer program comprising:
setting a specified movement amount with respect to rotation velocity of the focus ring member, based on a relationship between rotation velocity of the focus ring member and movement amount of the focus adjustment lens that is stored in the memory; and
controlling movement of the focus adjustment lens in accordance with rotation amount and rotation direction of the focus ring member based on the movement amount, and, when rotation velocity that has been detected by the rotation velocity detector is larger than a specified value, setting a specified movement amount with respect to rotation velocity of the focus ring member, based on a relationship between rotation velocity of the focus ring member and movement amount of the focus adjustment lens that is stored in the memory.

19. The non-transitory computer-readable medium of claim 15, wherein the relationship between the rotation amount of the focus ring member and the image plane movement amount is stored in a plurality of entries of a table stored in the memory.

20. The non-transitory computer-readable medium of claim 18, wherein:
the photographing device further comprises a setting section for setting of setting values for operation of the focus ring member, and the memory stores a plurality of relationships between rotation velocity of the focus ring member and movement amount of the focus adjustment lens, and
selection is made from the plurality of relationships between rotation velocity of the focus ring member and movement amount of the focus adjustment lens that are stored in the memory in accordance with setting value output from the setting section, and the specified movement amount with respect to rotation velocity of the focus ring member is set based on the selected relationship.

* * * * *